(Model.)

N. CLARK.
MAGNIFYING GLASS.

No. 362,492. Patented May 10, 1887.

WITNESSES
Charles H. Roberts
Cyrus Kehr

INVENTOR
Norman Clark
per Manahan & Ward
His Atty's

UNITED STATES PATENT OFFICE.

NORMAN CLARK, OF STERLING, ILLINOIS.

MAGNIFYING-GLASS.

SPECIFICATION forming part of Letters Patent No. 362,492, dated May 10, 1887.

Application filed January 31, 1887. Serial No. 226,049. (Model.)

*To all whom it may concern:*

Be it known that I, NORMAN CLARK, a citizen of the United States, residing at Sterling, in the county of Whiteside and State of Illinois, have invented certain new and useful Improvements in Magnifying-Glasses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to certain improvements in magnifying-glasses, and pertains more especially to the provision of a reflector or reflectors placed in such position therein as to throw the reflected light forward upon the object to be examined.

While my invention is adapted for use in any species of magnifying-glasses, it is more particularly applicable to jewelers' magnifying-glasses, used generally for the inspection of the interior of watches, and as thus applied is shown and described in this application. In the greater proportion of cases in the use of such glasses the latter are required to be brought quite close to the object to be inspected, and as a consequence the light is thereby largely excluded from such object, and in the case of looking into the interior of watches much of the locality to be inspected is necessarily darkened.

The object of my invention is to reflect such rays of light as may be emitted from the object under inspection or from without it back upon the latter, and thus increase the light upon and the facility of inspecting such object.

Figure 1:
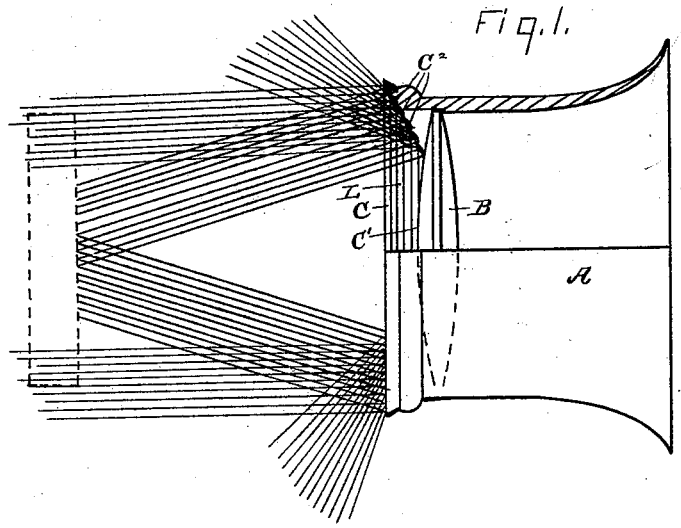
Figure 3:
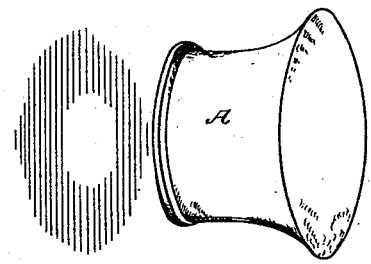
Figure 2:
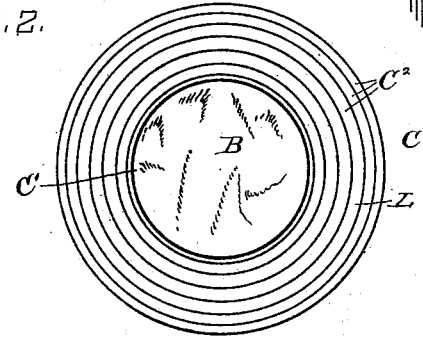

In the drawings, Figure 1 is a side elevation, partly in section, of a jeweler's eyeglass embodying my invention. Fig. 2 is the outer end of such glass provided with my invention. Fig. 3 exhibits its practical effect.

A is the case of the glass.

B is the usual lens suitably seated within and across said case a short distance inward from the outer end of the latter.

C is an annular reflector, provided with a polished or bright exterior surface and having an annular central opening, C', and seated within the outer end of the case A, either within or without (but preferably without) the lens B.

The reflector C is sloped inward from the wall of the case A to the lens B, so that such reflecting-surface L, from its outer to its inner edge, recedes from the object under examination, and is thereby adapted to gather the rays of light impinging upon such surface from without the object to be examined, and to reflect such rays upon the latter. The reflector C is also formed of parallel annular ridges or corrugations $C^2$, in order to more effectually break up and disseminate the rays of light falling upon them.

In the use of my invention the operator looks through the lens B and central opening, C', in the reflector C, and the latter constitutes a reflecting-surface entirely around said opening, and can be so shaped as to be adapted to increase the light at any point in front of the glass. If the maximum of light reflected should, from the conformation of the reflecting-surface or by reason of the angle at which the outside light falls upon said reflector, fail to concentrate upon the point in front of the center of the opening C, a slight change in the position of the glass will allow the reflected light to fall on the point desired.

What I claim as my invention, and desire to secure by Letters Patent of the United States, is—

1. In combination with the lens B and the case A of a magnifying-glass, the annular reflector C, provided with the central opening, C', and so placed in the outer end of said case as to reflect and converge the rays of light in front of said glass, substantially as shown, and for the purpose described.

2. In a magnifying-glass, the combination of the case A, the lens B, and the annular reflector C, provided with central opening, C', and corrugations $C^2$, and so seated in the outer end of such glass as to reflect the rays of light falling on the outer side thereof in front of said glass, substantially as shown, and for the purpose described.

3. The combination of the case A, lens B, and the annular reflector C, the latter provided with the central opening, C', and the receding exterior reflecting-surface, L, as shown, for the purpose described.

In testimony whereof I affix my signature in presence of two witnesses.

NORMAN CLARK.

Witnesses:
SOLOMON P. GIDDINGS,
PHILIP B. SMITH.